R. S. GRANT.
LICENSE TAG HOLDER.
APPLICATION FILED JULY 24, 1916.

1,218,761.

Patented Mar. 13, 1917.

Inventor
Richard S. Grant,
By C. E. Humphrey
Attorney

UNITED STATES PATENT OFFICE.

RICHARD S. GRANT, OF AKRON, OHIO.

LICENSE-TAG HOLDER.

1,218,761.   Specification of Letters Patent.   Patented Mar. 13, 1917.

Application filed July 24, 1916. Serial No. 110,992.

*To all whom it may concern:*

Be it known that I, RICHARD S. GRANT, a citizen of the United States, residing at Akron, in the county of Summit and State of Ohio, have invented new and useful Improvements in License-Tag Holders, of which the following is a specification.

This invention relates to an improvement in frame-like devices for holding such articles as license tags for automobiles, although its use is not thereby limited. An object of the invention is to provide a frame on which a license tag or similar article can be held securely with the reading material thereon exposed and protected if necessary, by a sheet of transparent material and further provided with means for properly supporting the same. A still further object of the device is to make the device or frame adjustable as to length and breadth so as to adapt it for receiving license tags or similar objects of various sizes.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1, is a view in front elevation of the device embodying this invention.

Figure 1:
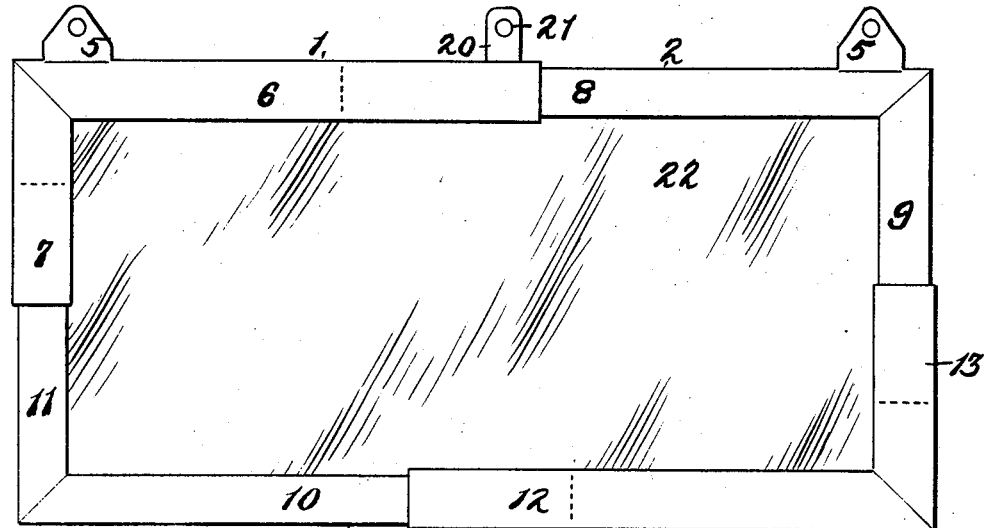
Figure 2:
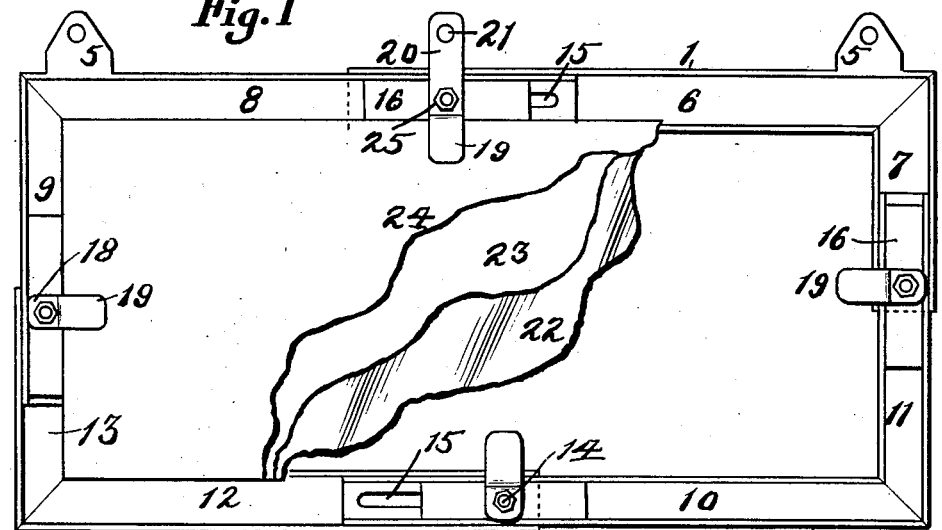
Fig. 2, is a rear elevation of the device shown in Fig. 1.
Figures 3, 4:
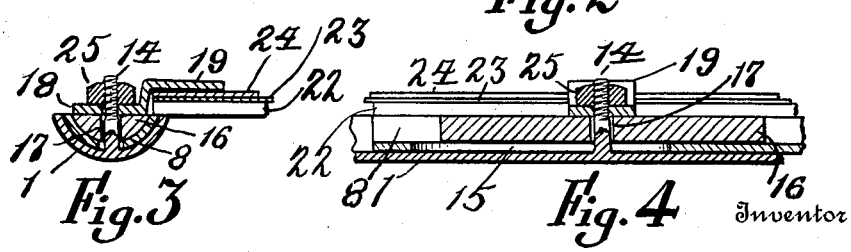
Figs. 3 and 4 are transverse and longitudinal sectional views respectively of the joints between connected portions of the device.

The device comprises four members, 1, 2, 3 and 4. The members 1 and 2 are provided with upwardly extending apertured lugs 5 for connecting the device with a supporting instrumentality. Otherwise the members 1 and 4 are similar and the members 2 and 3 are also similar, hence a description of the members 1 and 2 and their connection with the members 3 and 4 is believed to be sufficient for the understanding of the entire device. All of the members are trough-shaped or semi-circular in cross section. The members 1 and 4 are larger in transverse cross section than are the members 2 and 3 and the smaller members 2 and 3 are adapted to telescope the coadjacent portions of the members 1 and 4. The member 1 comprises a long arm 6 and a shorter arm 7 arranged at right angles; the member 2 comprises a long arm 8 and a shorter arm 9 arranged at right angles; the member 3 consists of a long arm 10 and a shorter arm 11 at right angles thereto; and the member 4 comprises a long arm 12 and a shorter arm 13 arranged at right angles. The member 1 is provided near the two ends 6 and 7 thereof, and the member 4 near the ends 12 and 13 with centrally disposed threaded studs 14 projecting upwardly in the spaces surrounded by the walls of the members. The arms 10 and 11 of the member 3 and the arms 8 and 9 of the member 2 are provided with slots 15 through which the pins or studs 14 are received. By assembling the various members 1—4 inclusive in rectangular formation as shown in Fig. 1 with the stud on the arm 7 projecting through the slot in the arm 11; the stud on the arm 6 extending through the slot in the arm 8 of the member 2; the stud on the arm 13 projecting through the slot in the arm 9 and the stud on the arm 12 of the member 4 extending through the slot in the arm 10 of the member 3. In the hollows or cavities of the smaller arms 8, 9, 10 and 11 are placed reinforcing members 16 provided with apertures 17 to receive the various studs 14. These reinforcing members 16 extend longitudinally of the lapped joints between connected members a sufficient distance to stiffen the union between the two. In order to hold a translucent sheet of material and a license tag or similar device I employ a plurality of clamps 18 provided with recesses to receive the studs 14 and further provided with offset portions 19 preferably extending inwardly toward each other and toward the space inclosed by the device. The clamp on the stud 14 which connects the arms 6 and 8 is provided with an outwardly projecting extension 20 provided with an aperture 21 for a purpose to be later described. The edges of the rear faces of all of the arms constituting the members 1—4 inclusive are in a substantially true plane and the inner walls surrounding the device constitute seats for supporting either a license tag, a sheet of translucent material or both, or if the license tag is of some destructible material such as card-board a backing strip or plate may be employed. In the drawing, reference numeral 22 denotes a sheet of translucent material, 23 denotes a license tag and 24 denotes a back or reinforcing strip of plate. These are all mounted on the inner edges of the various arms of the members 1—4 inclusive and are held in position by clamping members 19 engaging the member 24. It will be obvious, of course, that in case it is so desired the sheet of translucent material 22 may be omitted or in case a metal license tag is employed the reinforcing or backing strip 24 may be omitted and in any event the clamping members 19 will hold the license tag or similar object either in connection with a transparent sheet or in connection with a transparent sheet and a backing strip as the case may be. The projection 20 with its aperture 21 is used as additional means for supporting the entire device in those cases, where the supporting instrumentality, as an automobile for instance, is not provided with apertures which would easily register with the apertures in the lugs 5 and in other words to offer additional means for the connection of the device to the support. After seating the license tag and applying the clamps 19 thereto the clamping members 18 are drawn down against the reinforcing members 16 by means of clamping nuts 25, which force the members 18 into snug engagement with the reinforcing member 16 and with the overlapping portions of contiguous members against each other for frictionally holding all of the members together and in assembled relation.

I claim:

1. A license tag holder comprising four L-shaped members all of which are trough-shaped in cross section, two of the members being greater in cross sectional area than the other two and with the larger and smaller members alternating in position, the ends of coadjacent members adapted to telescope, the ends of the smaller members provided with slots, studs on the hollow faces of the larger members and adapted to project through said slots, reinforcing members provided with apertures to receive said studs and positioned in the smaller members at the joints between larger and smaller members, clamping members mounted on said studs, means on said studs to draw said clamping members toward said L-shaped members to clamp a license tag against the faces of said L-shaped members.

2. A license tag holder comprising four L-shaped members all of which are trough-shaped in cross section, two of the members being greater in cross sectional area than the other two and with the larger members opposing each other diagonally of the structure and the smaller members similarly disposed and alternating in position thereto, the ends of the smaller members adapted to be received in and lap the ends of the coadjacent larger members, the ends of the smaller members provided with slots, studs on the inner hollow faces of the larger members and adapted to project through said slots, reinforcing members mounted in the hollow portions of the smaller members where said smaller members overlap the ends of the larger members, said reinforcing members provided with apertures to receive said studs, clamping members extending inwardly toward each other mounted on said studs, means on said studs to draw said clamping members toward said L-shaped members for holding a license tag in position.

3. A license tag holder comprising four L-shaped members all of which are trough-shaped in cross section thereby providing one convex face and one concave face for each member, all of the edges of said members being approximately in the same plane, each concave face constituting a seat, two of the members fashioned of greater cross sectional area than the other two and disposed with the larger members opposing each other diagonally of the structure and with the smaller members similarly positioned, the ends of the smaller members adapted to be received in and overlap the ends of the larger members, the ends of certain of the members provided with slots, studs on the faces of the other members and adapted to project through said slots, reinforcing members provided with apertures adapted to receive said studs positioned in said smaller members where said members overlap, a sheet of transparent material mounted on said seats, a license tab or the like positioned against said sheet of transparent material, clamping members arranged on said members, and means to draw said clamping members toward said seats to hold said license tag and transparent sheet firmly against said seats.

4. A device of the class described comprising a plurality of trough-shaped members fashioned, when assembled, to form a hollow frame-like structure, a portion of said members being of larger cross sectional area than the others to thereby permit the nesting and overlapping of the end portions of coadjacent members, the ends of certain of said members where they overlap being provided with slots, means carried by the end portions of the other members arranged to extend through said slots, means on said extending means for clamping the overlapping portions of contiguous members together, and means for clamping a device such as a license tag against the edges of the rear faces of said members.

In testimony whereof I have hereunto set my hand in presence of two subscribing witnesses.

RICHARD S. GRANT.